Oct. 2, 1923.
J. SILBERHARTZ ET AL
1,469,539
GAS FIXTURE WITH DETACHABLE SHADE
Filed June 1, 1921
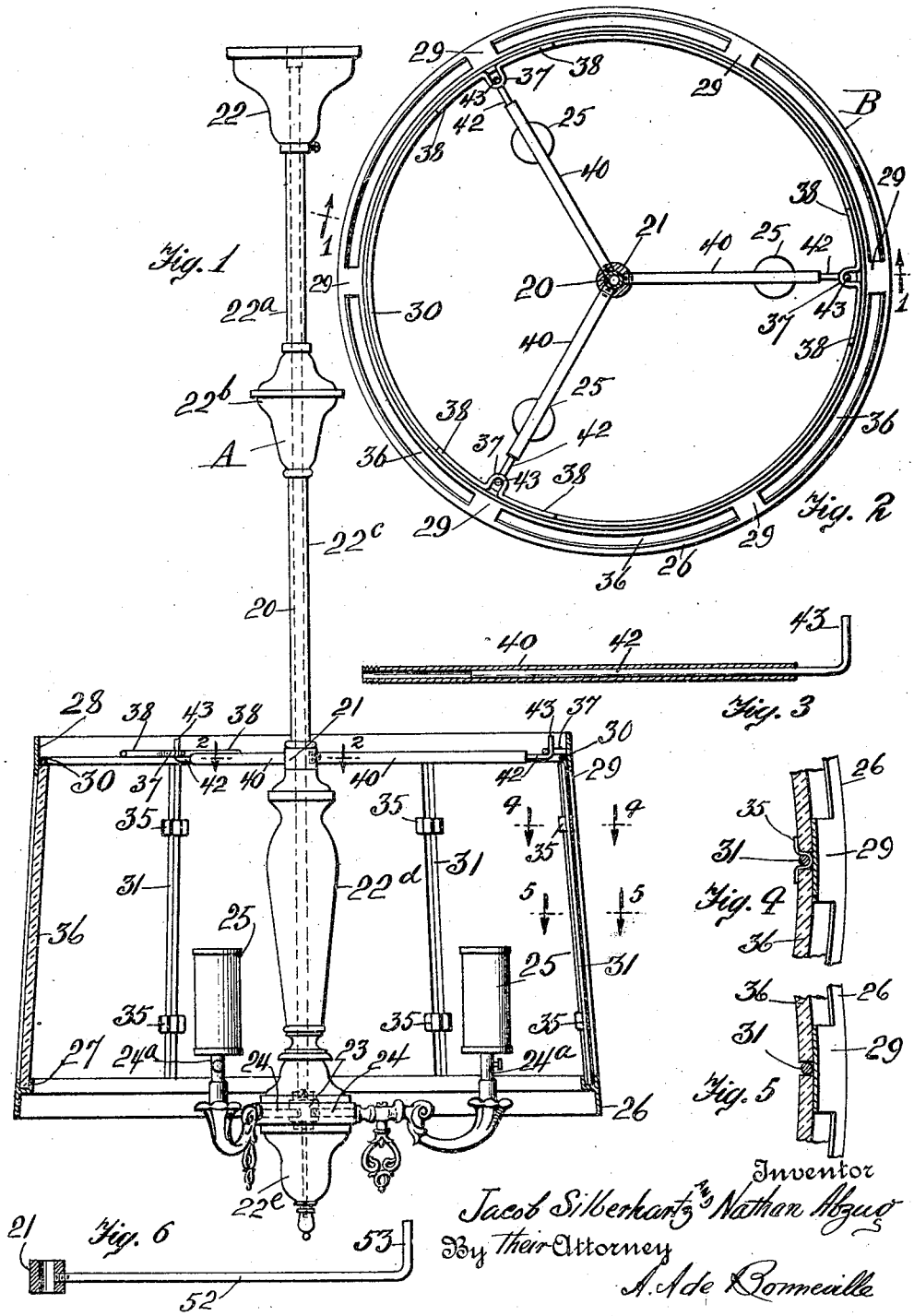

Patented Oct. 2, 1923.

1,469,539

UNITED STATES PATENT OFFICE.

JACOB SILBERHARTZ AND NATHAN ABZUG, OF NEW YORK, N. Y.

GAS FIXTURE WITH DETACHABLE SHADE.

Application filed June 1, 1921. Serial No. 474,307.

*To all whom it may concern:*

Be it known that we, JACOB SILBERHARTZ and NATHAN ABZUG, citizens, respectively, of the Republic of Poland and of the United States, and residents, respectively, of the borough of Manhattan, city of New York, county of New York, and State of New York, and of the borough of Bronx, in the county of Bronx and State of New York, have jointly invented certain new and useful Improvements in Gas Fixtures with Detachable Shades, of which the following is a specification.

This invention relates to a gas fixture with a detachable shade. Its object is the production of a gas fixture with a plurality of lights, and a shade open at its top and bottom ends for both direct and indirect light. Locking latches preferably adjustable connect the shade to the fixture.

In the accompanying drawings Fig. 1 represents a side elevation of an exemplification of the gas fixture and shade, the shade being indicated partly in section as on the line 1, 1 of Fig. 2; Fig. 2 shows a section of Fig. 1 on the line 2, 2; Fig. 3 is an enlarged side view of a locking latch with an element thereof in longitudinal section; Fig. 4 represents an enlarged section of Fig. 1 on the line 4, 4; Fig. 5 indicates an enlarged section of Fig. 1 on the lines 5, 5, and Fig. 6 shows a modification of a detail.

The gas light fixture indicated in its entirety by the letter A, comprises the main gas conduit 20 on which are supported the sleeve 21, the canopy 22, the covering tube 22$^a$, the break-ball 22$^b$, the covering tube 22$^c$, the column 22$^d$ and the body 22$^e$. A special fitting 23 is connected to the conduit 20 and from which lead the branch pipes 24 with the gas outlet pipes 24$^a$. Chimneys 25 are provided for the said outlet pipes.

The shade is indicated in its entirety by the letter B and comprises a metallic frame with the lower member 26 having the annular pocket 27, the upper member 28 somewhat smaller in diameter than the member 26 and the connecting members 29. A bead 30 is fastened to the member 28 and a plurality of beads 31 are fastened to the members 29, and extend between the bead 30 and the lower member 26. Clamps 35 are fastened to the beads 31. Glass panels 36 are supported in the pocket 27 between the beads 31 and are locked in place by the clamps 35. A plurality of eyes 37 have each the arms 38 which are fastened to the member 28.

A plurality of tubular supports 40 have each one end in threaded engagement with threaded openings in the sleeve 21. An adjustable locking hook with the horizontal member 42 and the vertical member 43 is slidably supported in each tubular support 40. The said vertical member 43 of each locking hook is locked with one of the eyes 37. The horizontal member 42 of each hook can be moved in its accompanying tubular support 40 and thereby the vertical members 43 can be locked with the eyes 37 of shades B of various diameters. The support 40 can be easily detached from the sleeve 21 for packing and shipping purposes.

In Figure 6 a stationary locking hook is indicated with the horizontal member 52 and the vertical member 53. The end of the member 52 is in threaded engagement with the sleeve 21. It is to be understood that a plurality of stationary locking hooks can be substituted for the adjustable locking hooks.

Various modifications may be made in the construction of the invention and the present exemplification is to be taken as illustrative and not limitative thereof.

Having described our invention what we desire to secure by Letters Patent and claim is:

The combination of a gas light fixture, a main gas conduit for the fixture, a plurality of gas outlets for the fixture, a sleeve supported on said conduit, detachable tubular supports with one end of each in threaded engagement with the sleeve, locking hooks each with a horizontal member and a vertical member, each of said horizontal members slidably supported in one of the tubular supports, a shade encircling the fixture and a plurality of eyes fastened to the shade, each eye adapted to lock with a vertical member of said locking hooks and thereby detachably supporting the shade.

Signed at the borough of Manhattan, city of New York, in the county of New York and State of New York, this 23d day of May A. D. 1921.

JACOB SILBERHARTZ.
NATHAN ABZUG.